United States Patent [19]

Chang et al.

[11] Patent Number: 5,417,994
[45] Date of Patent: May 23, 1995

[54] MICROSTABLE, PRESERVATIVE-FREE BEVERAGES AND PROCESS OF MAKING

[75] Inventors: Pei K. Chang, Montrose, N.Y.; Daniel Blase; Bruce Leavitt, both of Danbury, Conn.; Shashi Deshpande, New City, N.Y.; Mansour Tavangaran, Danbury, Conn.

[73] Assignee: Pepsico, Inc., Purchase, N.Y.

[21] Appl. No.: 41,221

[22] Filed: Mar. 31, 1993

[51] Int. Cl.$^6$ ................................ A23L 2/00
[52] U.S. Cl. .................... 426/330.3; 426/74; 426/590; 426/650; 426/654; 426/658
[58] Field of Search .............. 426/330.3, 590, 74, 426/650, 654, 658

[56] References Cited

U.S. PATENT DOCUMENTS

| | | |
|---|---|---|
| 3,366,490 | 1/1968 | Wagner et al. |
| 3,681,091 | 8/1972 | Kohl et al. .............. 99/150 |
| 3,773,961 | 11/1973 | Gordon ............... 426/330.3 |
| 4,061,792 | 12/1977 | Inagami et al. |
| 4,061,797 | 12/1977 | Hannan, Jr. et al. ......... 426/590 |
| 4,145,451 | 3/1979 | Oles ................. 426/321 |
| 4,235,936 | 11/1980 | Kahn et al. |
| 4,534,991 | 8/1985 | Kryger. |
| 4,551,342 | 11/1985 | Nakel et al. |
| 4,737,375 | 4/1988 | Nakel et al. |
| 4,756,919 | 7/1988 | Cirigiano et al. |
| 4,830,862 | 5/1989 | Braun et al. |
| 4,840,806 | 6/1989 | Hyldon et al. |
| 4,925,686 | 5/1990 | Kastin. |
| 4,927,657 | 5/1990 | Antaki et al. |
| 4,996,070 | 2/1991 | Nafisi-Movaghar. |
| 5,021,251 | 6/1991 | McKenna et al. |

FOREIGN PATENT DOCUMENTS

| | | |
|---|---|---|
| 49-4372 | 1/1974 | Japan. |
| 404847 | 5/1974 | U.S.S.R. |

OTHER PUBLICATIONS

Hawley, G. 1981. The Condensed Chemical Dictionary, 10th Ed. Van Nostrand Reinhold Co. N.Y., p. 15.
L. A. Shelef, "Antibacterial Effects of Metal Sequestrants," 1986, Elsevier Science Publishers B.V., Amsterdam.

*Primary Examiner*—Helen Pratt
*Attorney, Agent, or Firm*—Finnegan, Henderson, Farabow, Garrett & Dunner

[57] ABSTRACT

The invention is directed to microstable soft drink beverages containing at least two edible acids chosen from phosphoric, citric and malic acids as a microstabilizer, in combination with water, a flavor system of one or more flavor extracts and distillates, and a sweetener, such as HFCS. The beverages have a pH of from 2.2 to 2.7 and a TA of from 15 to 33. The beverages may advantageously contain additional ingredients, such as potassium chloride and another microstabilizing ingredient such as sodium polyphosphate, d-limonene or ascorbic acid. Such beverages have a desirable balance of organoleptic properties and are rendered highly microstable without the use of conventional chemical preservatives or thermal processing.

20 Claims, No Drawings

MICROSTABLE, PRESERVATIVE-FREE BEVERAGES AND PROCESS OF MAKING

BACKGROUND OF THE INVENTION

1. Field of the Invention

The present invention relates generally to "preservative-free" syrup and beverage compositions and a method of making them, that is, syrup and beverage compositions containing no conventional chemical food preservatives, such as sorbic, benzoic and propinoic acids and the alkali metal salts thereof. More particularly, the invention relates to cold-filled microstable, preservative-free soft drinks having desirable taste and drinkability properties.

2. Description of Related Art

In order to achieve an adequate unrefrigerated shelf-life, conventional chemical preservatives, heat treatment, or a combination of both, typically has been used to produce microstable beverages (i.e., beverages stabilized against microbiological spoilage).

Heat treatment or thermal processing steps, such as hot filling and tunnel pasteurization, have been used to reduce yeast, mold and microbial growth in food and beverage products. For example, U.S. Pat. No. 4,830,862 to Braun et al. discloses the use of pasteurization in the production of fruit juice beverages as well as the use of suitable preservatives in carbonated beverages. U.S. Pat. No. 4,925,686 to Kastin discloses a heat-pasteurized freezable fruit juice composition which contains sodium benzoate and potassium sorbate. However, such heat treatments have various disadvantages, such as consumption of energy and time as well as deleterious effects on the organoleptic properties of the thermally-processed products.

Chemical preservatives have long been used as another means of deterring microbial growth in beverages, thus enhancing product shelf-life. Conventional chemical food preservatives, i.e., those chemical compounds which are now classified and labelled as food preservatives under U.S. regulations, include sodium and potassium benzoate, sodium and potassium sorbate, and the like.

For example, U.S. Pat. Nos. 4,551,342 and 4,737,375 to Nakel et al. teach the use of sodium and potassium salts of benzoic acid to preserve the beverage systems exemplified therein. U.S. Pat. No. 4,996,070 to Nafisi-Movaghar lists sodium benzoate, potassium sorbate and alkyl parabens as examples of anti-microbial agents. U.S. Pat. No. 5,021,251 to McKenna et al. similarly discloses the use of sodium benzoate as a mold inhibitor.

"Clearly Canadian" and "Nordic Mist" are beverage products which contain water, a sweetener, natural flavor, and sodium or potassium benzoate as a preservative. A typical "Nordic Mist" composition includes: pure sparkling water, high-fructose corn syrup, citric acid, natural flavor and potassium benzoate. A "Clearly Canadian" composition typically includes the following ingredients: Canadian water, carbon dioxide, sugar, citric acid, natural flavor and sodium benzoate.

Although conventional chemical preservatives have been effective against microbial spoilage in beverages, due to growing consumer concern regarding product health attributes, there has been a desire for beverages free of these chemical food preservatives.

Some preservative-free food products have been developed. For example, certain additives have been disclosed as helping inhibit spoilage of food products. U.S. Pat. No. 3,681,091 to Kohl et al. relates to retarding spoilage of food products by means of polyphosphates. U.S. Pat. No. 4,534,991 to Kryger discloses the addition of an aseptic flavor system containing alcohol added to a previously pasteurized juice.

Certain systems containing acids have also been developed for helping preserve specific food products. U.S. Pat. No. 4,145,451 to Oles refers to a preservation system containing acetic acid and phosphoric acid for low-acid food products, specifically, mayonnaise, salad dressings and the like. U.S. Pat. No. 4,927,657 to Antaki et al. similarly refers to salad dressings preserved with buffered systems of phosphoric/acetic acids, acetic acid, acetic/fumaric acids, phosphoric/acetic/lactic acids, phosphoric/acetic/citric acids or phosphoric/lactic acids. Although such acid preservation systems have been developed for certain foodstuffs, these systems are not appropriate for beverages which require distinct organoleptic attributes.

Systems have also been developed for preserving beverages. U.S. Pat. No. 4,756,919 to Cirgiano et al. discloses beverage compositions employing a preservation system containing fumaric acid, but the exemplary compositions also contain sodium benzoate.

Cola-type carbonated beverages have been developed containing no conventional preservatives, which are flavored using emulsions of cola flavor oil. One known cola product contains phosphoric and citric acids, has a pH of 2.5 and a TA (titratable acidity) of 12.5, and is carbonated with 3.4 volumes of $CO_2$ (i.e., 3.4 liters of $CO_2$ per liter of beverage). Another known cola product contains phosphoric acid and 3.6 volumes of $CO_2$, and has been found to have a pH of 2.5 and a TA of 13. Many consumers, however, desire non-preserved beverages which are not of the conventional cola type, such as beverages which have attributes of sports-drink type beverages, e.g., smoothness, nutritional content, citrus/fruit taste, etc.

Another product which contains no conventional chemical food preservatives is "Enduro," which is a carbonated beverage containing malic acid. Analysis of "Enduro" shows that this product has a pH of 2.7 and a TA of 30. Although "Enduro" is preservative-free, it suffers from various drawbacks, such as a relatively harsh taste due to the high amount of malic acid.

Therefore, it can be seen that it would be advantageous to provide a microstable, cold-filled soft-drink type beverage which has desirable attributes, such as being preservative-free and highly drinkable.

SUMMARY OF THE INVENTION

An object of the present invention is to provide a preservative-free, soft-drink type beverage which is microstable and which exhibits a combination of desirable drinkability attributes, such as desirable flavor, aroma, sweetness, tartness, saltiness, smoothness, aftertaste, ease of going down and thickness/mouthfeel.

Another object of the invention is to provide a method of making refreshing, highly-drinkable, microstable, preservative-free soft drinks without the use of heat treatment or thermal processing.

An additional object of the invention is to provide highly microstable, preservative-free beverages containing vitamin or nutritional supplements which have a desirable balance of organoleptic properties.

A further object of the invention is to provide a method of making preservative-free soft drinks with little or no carbonation.

Another object of the invention is to provide preservative-free, non-cola-type soft drinks with a citrus/fruit flavor.

The foregoing objects and advantages have been achieved in accordance with the present invention by means of a carbonated beverage containing a microstabilizer consisting essentially of a specific combination of acids yielding a beverage pH of from about 2.2 to about 2.7 and a TA (titratable acidity) of from about 15 to about 33. To protect against mold growth, the maximum pH of still beverages containing a microstabilizer in accordance with the invention should be no greater than 2.5.

The acid combination contains at least two edible acids selected from phosphoric acid, citric acid and malic acid. In a preferred embodiment, the acid combination contains all three of these acids.

In one embodiment, the beverage contains, in addition to the microstabilizing acid combination, water, no or little carbonation (e.g., a still beverage or a carbonated beverage containing from 1.0 to 3.3 volumes $CO_2$, for example about one volume $CO_2$), a flavoring system composed essentially of one or more flavoring agents that contain no juice, selected from flavor extracts and distillates (e.g., a citrus-type flavoring agent), and a sweetener whereby an advantageous balance of taste and drinkability characteristics is achieved.

In another embodiment, in addition to the acid combination the beverage contains a polyphosphate as another microstabilizing ingredient, and water, one or more vitamin and/or mineral supplements, a flavoring system composed essentially of one or more flavoring agents that contain no juice and are selected from flavor extracts and distillates, preferably a citrus-type flavoring system which yields a fruity flavor, and a sweetener whereby an advantageous balance of taste and drinkability characteristics is achieved.

In preferred embodiments, potassium chloride is added, which enhances drinkability and smoothness of the beverage compositions.

In further preferred embodiments, the beverage also contains vitamins and a polyphosphate, such as a glassy sodium polyphosphate, and optionally d-limonene to further enhance microstability. When the beverage contains one or more vitamins excluding vitamin C (ascorbic acid), a glassy sodium polyphosphate is added to achieve microstability. Preferably, mold growth is controlled by adding an oxygen scavenger, preferably vitamin C, and/or using a low volume of carbonation with or without nitrogen injection into the beverage package (e.g., bottle or can) to remove oxygen from the head space. Ascorbic acid (vitamin C) thus provides nutritional supplementation and enhances microstability.

There is also provided in accordance with the present invention a method of making a microstable, preservative-free soft drink product by steps including: formulating a beverage containing water, a flavoring system composed essentially of one or more flavoring agents selected from flavor extracts and distillates, a sweetener, and a microstabilizing acid combination of at least two edible acids selected from phosphoric acid, citric acid and malic acid, whereby the beverage has a pH of from 2.2 to 2.7 where the beverage is carbonated, and a pH of from 2.2 to 2.5 where the beverage is still, and a TA of from 15 to 33; and cold-filling the beverage in a container without any heat treatment or thermal processing.

Additional objects and advantages of the invention will be set forth in part in the detailed description of exemplary embodiments which follows, and in part will be apparent from the description, or may be learned through routine practice of the invention.

DETAILED DESCRIPTION OF THE INVENTION

Reference will now be made in detail to the presently preferred embodiments which are exemplary of the invention.

In one preferred embodiment, the microstabilizing acid combination consists of phosphoric acid and citric acid. In another preferred embodiment, the microstabilizing acid mixture consists of phosphoric acid, citric acid and malic acid. Preferably, the beverage pH is from about 2.2 to about 2.5, and the TA is from about 17 to about 33.

Sweeteners which may be used in the syrups and beverages of the invention include natural sweeteners, such as high-fructose corn syrup and sucrose, and artificial sweeteners, such as aspartame. The preferred natural sweetener is high-fructose corn syrup (HFCS) and the sweetener preferably is present in an amount to yield a true Brix range in the final beverage of from about 6 to about 14.

In alternative embodiments, nutritional/vitamin supplements are added, preferably in amounts equivalent to at least 10% of the U.S. RDA (recommended daily allowance). In these embodiments, the microstabilizer also includes a glassy sodium polyphosphate, preferably having a chain length of 13–25 (i.e., a compound of the formula $(HPO_3)_n \cdot Na_2O$ wherein n=13–25), such as sodium hexametaphosphate, along with the acid combination. Optionally, d-limonene is also added as an additional microstabilizing ingredient.

A preferred beverage composition contains one or more flavor extracts and a combination of phosphoric and citric acids, has a pH of from about 2.3 to about 2.5 and a TA of from about 16 to about 33, more preferably, a pH of about 2.3 and a TA of about 28–33, and is still or carbonated with from 1.0 to 3.3 volumes $CO_2$. Preferably, the beverage is carbonated. According to one preferred embodiment, potassium chloride is added to the make the beverage composition more drinkable, smooth and refreshing.

Specific examples of beverage systems in accordance with the invention are provided below and are further illustrative of the invention.

EXAMPLE 1

Orange Soft Drink Syrup

A syrup formulation was prepared by combining the ingredients listed below in the indicated amounts. As used herein, "HFCS" means high-fructose corn syrup, "cloud" means a suitable cloud agent to provide turbidity, and "treated water" means purified water.

| Ingredient | Amount |
| --- | --- |
| Orange flavor | 53.43 g |
| Cloud | 28.98 g |
| Phosphoric acid (80 wt. % aq. soln.) | 14.80 g |
| Malic acid | 2.50 g |

| Ingredient | Amount |
| --- | --- |
| Citric acid | 1.66 g |
| Sodium chloride | 11.65 g |
| Calcium chloride | 1.56 g |
| Monopotassium phosphate | 7.99 g |
| Ascorbic acid | 6.76 g |
| FD&C Yellow #6 | 0.625 g |
| HFCS 55 (77° Brix) | 2636.0 g |
| Treated water | Q.S. to 5000 ml |

Still Beverage

To prepare a still orange sports-type beverage, one volume of the above-identified syrup formulation was diluted with four volumes of treated water and bottled in 10-oz. glass containers. The beverage pH was 2.5 and the TA (titratable acidity) was 17.

Low-Carbonation Beverage

To prepare a low-carbonation, orange-flavored sports-type beverage, one volume of the above-identified syrup formulation is diluted with four volumes of carbonated water containing about one volume of $CO_2$ and bottled in 10-oz. glass containers.

EXAMPLE 2

Orange Soft Drink

A syrup formulation is prepared as in Example 1 above, except that 5 g of a glassy sodium polyphosphate is added. The finished beverages, which are prepared as in Example 1, have enhanced microstability.

EXAMPLE 3

Orange Soft Drink

A syrup and beverages are prepared as in Example 1 above, except that 1 g of d-limonene (delivered in the form of a 10% w/v solution in alcohol, wherein 1% w/v = 1 g d-limonene per 100 ml of alcohol) is added to the syrup formulation. The resulting beverages have enhanced preservation against spoilage.

EXAMPLE 4–6

Orange Soft Drink

Syrups and beverages are prepared in accordance with Examples 1–3, respectively, except that an additional 12.5 g of phosphoric acid (80 wt. %) and an additional 308 g of HFCS are added to the syrups. The finished beverages have a pH of about 2.3 and a TA of about 26.

EXAMPLE 7

Fruit Punch Soft Drink Syrup

A syrup formulation is prepared by combining the ingredients listed below in the indicated quantities.

| Ingredient | Amount |
| --- | --- |
| Fruit punch flavor | 33.64 g |
| Cloud | 28.95 g |
| Phosphoric acid (80%) | 14.80 g |
| Malic acid | 2.50 g |
| Citric acid | 1.66 g |
| Sodium chloride | 11.65 g |
| Calcium chloride | 1.56 g |
| Monopotassium phosphate | 7.99 g |
| Ascorbic acid | 6.76 g |
| FD&C Red #40 | 1.65 g |
| HFCS 55 (77° Brix) | 2944.0 g |
| Treated water | Q.S. to 5000 ml |

Still Beverage

To prepare a still fruit punch sports-type beverage, one volume of the syrup formulation is diluted with four volumes of treated water and bottled in 10-oz. glass containers. The beverage pH is 2.5 and the TA (titratable acidity) is 17.

Low-Carbonation Beverage

To prepare a low-carbonation, punch-flavored sports-type beverage, one volume of the above-identified syrup formulation is diluted with four volumes of water carbonated with about one volume of $CO_2$ and bottled in 10-oz. glass containers.

EXAMPLE 8

Fruit Punch Soft Drink

A syrup formulation is prepared as in Example 7 above, except that 5 g of a glassy sodium polyphosphate is added. Beverages are then prepared from the syrup formulation as described in Example 7.

EXAMPLE 9

Fruit Punch Soft Drink

A syrup and beverages are prepared as in Example 7 above, except that 1 g of d-limonene is added to the syrup formulation to yield highly-drinkable finished beverages having high microstability.

EXAMPLE 10–12

Fruit Punch Soft Drinks

Syrups and beverages are prepared in accordance with Examples 7–9, respectively, except that an additional 12.5 g of an 80 wt. % solution of phosphoric acid and an additional 163 g of HFCS are added to the syrups. The finished beverages have a pH of about 2.3 and a TA of about 26.

EXAMPLE 13

Peach Soft Drink Syrup

A syrup formulation was prepared by combining the ingredients listed below in the indicated quantities.

| Ingredient | Amount |
| --- | --- |
| HFCS 55 (77° Brix) | 993.8 lbs. |
| Phosphoric acid (80%) | 3401.8 g |
| Citric acid | 3406.5 g |
| Potassium chloride | 690.7 g |
| Peach flavor (Bush Boake Allen Inc. 38475) | 2880 ml |
| Treated water | Q.S. to 150 gallons |

Beverage

To prepare a carbonated beverage, one volume of the syrup formulation was diluted with five volumes of carbonated water. The beverage pH was 2.3, the TA was 32.4, the Brix was 10.3° and the $CO_2$ was 3.3 volumes.

EXAMPLE 14

Raspberry Soft Drink Syrup

A syrup formulation was prepared by combining the ingredients listed below in the indicated quantities.

| Ingredient | Amount |
| --- | --- |
| HFCS 55 (77° Brix) | 993.8 lbs. |
| Phosphoric acid (80%) | 3401.8 g |
| Citric acid | 3406.5 g |
| Potassium chloride | 380.0 g |
| Raspberry flavor (Robertet NV 12,996) | 4205.2 ml |
| Treated water | Q.S. to 150 gallons |

Beverage

To prepare a carbonated beverage, one volume of the syrup formulation was diluted with five volumes of carbonated water. The beverage pH was 2.3, the TA was 32.4, the Brix was 10.3° and the $CO_2$ was 3.3 volumes.

EXAMPLE 15

Berry Soft Drink Syrup

A syrup formulation was prepared by combining the ingredients listed below in the indicated quantities.

| Ingredient | Amount |
| --- | --- |
| HFCS 55 (77° Brix) | 993.8 lbs. |
| Phosphoric acid (80%) | 3401.8 g |
| Citric acid | 3406.5 g |
| Potassium chloride | 690.7 g |
| Mixed Berry flavor (Quest E92-158D) | 4146.7 ml |
| Treated water | Q.S. to 150 gallons |

Beverage

To prepare a carbonated beverage, one volume of the syrup formulation was diluted with five volumes of carbonated water. The beverage pH was 2.3, the TA was 32.4, the Brix was 10.3° and the $CO_2$ was 3.3 volumes.

EXAMPLES 16

Cherry Soft Drink Syrup

A syrup formulation was prepared by combining the ingredients listed below in the indicated quantities.

| Ingredient | Amount |
| --- | --- |
| HFCS 55 (77° Brix) | 993.8 lbs. |
| Phosphoric acid (80%) | 4461.5 g |
| Citric acid | 1703.2 g |
| Potassium chloride | 310.9 g |
| Cherry flavor (F&C 710447) | 2763.0 ml |
| Treated water | Q.S. to 150 gallons |

Beverage

To prepare a carbonated beverage, one volume of the syrup formulation was diluted with five volumes of carbonated water. The beverage pH was 2.26, the TA was 28.7, the Brix was 10.3° and the $CO_2$ was 3.3 volumes.

For comparative purposes, the properties of Examples 13–16 are summarized in Table I below along with the properties for the corresponding "Clearly Canadian" (abbreviated as CC) products.

TABLE I

| Beverage Product | pH | TA | True Brix | Volumes $CO_2$ | Benzoate (ppm) |
| --- | --- | --- | --- | --- | --- |
| CC Orchard Peach | 3.07 | 41.20 | 9.20 | 3.11 | 147 |
| Ex. No. 13 | 2.3 | 32.4 | 10.3 | 3.3 | — |
| CC Country Raspberry | 2.96 | 36.70 | 8.00 | 3.20 | 150 |
| Ex. No. 14 | 2.3 | 32.4 | 10.3 | 3.3 | — |
| CC Mntn. Blackberry | 3.01 | 44.91 | 9.77 | 3.21 | 144 |
| Ex. No. 15 | 2.3 | 32.4 | 10.3 | 3.3 | — |
| CC Wild Cherry | 2.92 | 37.56 | 9.48 | 3.58 | 148 |
| Ex. No. 16 | 2.26 | 28.7 | 10.3 | 3.3 | — |

The beverages of Examples 13–16 were compared in a standard blind taste-test against the correspondingly-flavored "Clearly Canadian" products. The results are tabulated below:

TABLE II

| Example No. | % Preferring Over "Clearly Canadian" | % That Would Definitely or Probably Buy Product |
| --- | --- | --- |
| 13 | 68 | 65 |
| 14 | 62 | 48 |
| 15 | 55 | 41 |
| 16 | 49 | 46 |

As evident from the above results, the drinkability of preservative-free beverages prepared according to the invention compared favorably with that of beverages containing conventional preservatives.

Suitable flavoring agents that contain no juice and yield microstable beverages other than the flavors exemplified above may be used, with the specific flavor extract or distillate being selected to achieve the desired beverage flavor.

Other suitable ingredients may be added to the syrups and beverages in accordance with the invention. For example, sports-type drinks may be prepared by adding, in addition to ascorbic acid (vitamin C), one or more vitamin ingredients or nutritional supplements, such as vitamins B2, B6 and B12, niacin, pantothenic acid, biotin and folic acid, in an amount sufficient to obtain the desired RDA percentage. Preferably, at least 10% of the RDA for each of vitamins B2, B6 and B12, niacin, pantothenic acid, biotin and folic acid are added along with sodium polyphosphate.

It will be apparent to those skilled in the art that various other modifications and variations can be made in the present invention without departing from the scope or spirit of the invention. For example, suitable beverage ingredients other than those listed above, such as coloring agents, may be added. In addition to fruit-flavored soft drinks or beverages, other types of preservative-free beverages flavored with other suitable flavor extracts or distillates may be made by means of the present invention.

Thus, other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A microstable, soft drink beverage free of any preservative selected from the group consisting of sorbic acid, benzoic acid, propionic acid and alkali metal salts thereof, said beverage comprising:
- water;
- a microstabilizer consisting essentially of an acid combination consisting of at least two edible acids selected from the group consisting of phosphoric acid, citric acid and malic acid;
- a flavoring system consisting essentially of one or more flavoring agents selected from the group consisting of flavor extracts and distillates;
- a sweetener; and
- from 1.0 to 3.3 volumes of $CO_2$; wherein the beverage has a pH of from 2.2 to 2.7 and a TA of from 15 to 33.

2. A microstable soft drink beverage as recited in claim 1, wherein said acid combination consists of phosphoric acid, citric acid and malic acid.

3. A microstable soft drink beverage as recited in claim 1, wherein the pH is from 2.2 to 2.5 and the TA is from 17 to 33.

4. A microstable soft drink beverage as recited in claim 1, wherein the sweetener is high-fructose corn syrup and the true Brix range in the beverage is from 6 to 14.

5. A microstable soft drink beverage as recited in claim 1, wherein the acid combination consists of phosphoric acid and citric acid, and the pH is 2.3 and the TA is from 28 to 33.

6. A microstable soft drink beverage as recited in claim 1, wherein said one or more flavoring agents includes a citrus-type flavoring agent.

7. A microstable soft drink beverage as recited in claim 1, further comprising potassium chloride.

8. A microstable soft drink beverage free of any preservative selected from the group consisting of sorbic acid, benzoic acid, propionic acid and alkali metal salts thereof, said beverage comprising:
- water;
- a microstabilizer consisting essentially of an acid combination consisting of at least two edible acids selected from the group consisting of phosphoric acid, citric acid and malic acid;
- a flavoring system consisting essentially of one or more flavoring agents selected from the group consisting of flavor extracts and distillates;
- a sweetener; and
- from 0.0 to 3.3 volumes of $CO_2$; wherein the beverage has a pH of from 2.2 to 2.5 and a TA of from 15 to 33.

9. A method of making a microstable soft drink product, comprising the steps of:
- formulating a beverage free of any preservative selected from the group consisting of sorbic acid, benzoic acid, propionic acid and alkali metal salts thereof, said beverage containing water, a flavor system consisting essentially of one or more flavoring agents selected from the group consisting of flavor extracts and distillates, a sweetener, and a microstabilizer consisting essentially of an acid combination consisting of at least two edible acids selected from phosphoric acid, citric acid and malic acid, whereby the beverage has a pH of from 2.2 to 2.5 and a TA of from 15 to 33; and
- cold-filling the beverage in a container without any heat treatment or thermal processing.

10. A method of making a microstable soft drink product as recited in claim 13, further comprising carbonating the beverage with from 1.0 to 3.3 volumes of $CO_2$.

11. A method of making a microstable soft drink product as recited in claim 9, wherein said acid combination consists of phosphoric acid, citric acid and malic acid.

12. A method of making a microstable soft drink product as recited in claim 9, wherein the acid combination consists of phosphoric acid and citric acid, and the TA is from 17 to 33.

13. A method of making a microstable soft drink product as recited in claim 9, further comprising at least one of the following steps: carbonating the beverage with from 1.0 to 3.3 volumes of $CO_2$; filling a package with the beverage; and injecting nitrogen to remove oxygen from the package head space.

14. A microstable soft drink beverage free of any preservative selected from the group consisting of sorbic acid, benzoic acid, propionic acid and alkali metal salts thereof, said beverage comprising:
- water;
- a microstabilizer consisting essentially of an acid combination consisting of at least two edible acids selected from the group consisting of phosphoric acid, citric acid and malic acid, and at least one of a polyphosphate and d-limonene;
- a flavoring system consisting essentially of one or more flavoring agents selected from the group consisting of flavor extracts and distillates;
- a sweetener; and
- from 1.0 to 3.3 volumes of $CO_2$; wherein the beverage has a pH of from 2.2 to 2.7 and a TA of from 15 to 33.

15. A microstable soft drink beverage free of any preservative selected from the group consisting of sorbic acid, benzoic acid, propionic acid and alkali metal salts thereof, said beverage comprising:
- water;
- a microstabilizer consisting essentially of an acid combination consisting of at least two edible acids selected from the group consisting of phosphoric acid, citric acid and malic acid, and a polyphosphate;
- a flavoring system consisting essentially of one or more flavoring agents selected from the group consisting of flavor extracts and distillates;
- a sweetener;
- one or more nutritional supplements selected from the group consisting of vitamin B2, vitamin B6, vitamin B12, niacin, pantothenic acid, biotin and folic acid; and
- from 1.0 to 3.3 volumes of $CO_2$; wherein the beverage has a pH of from 2.2 to 2.7 and a TA of from 15 to 33.

16. A microstable soft drink beverage free of any preservative selected from the group consisting of sorbic acid, benzoic acid, propionic acid and alkali metal salts thereof, said beverage comprising:
- water;
- a microstabilizer consisting essentially of ascorbic acid and an acid combination consisting of at least two edible acids selected from the group consisting of phosphoric acid, citric acid and malic acid;
- a flavoring system consisting essentially of one or more flavoring agents selected from the group consisting of flavor extracts and distillates;
- a sweetener; and from 1.0 to 3.3 volumes of $CO_2$; wherein the beverage has a pH of from 2.2 to 2.7 and a TA of from 15 to 33.

17. A microstable soft drink beverage free of any preservative selected from the group consisting of sorbic acid, benzoic acid, propionic acid and alkali metal salts thereof, said beverage comprising:
   water;
   a microstabilizer consisting essentially of an acid combination consisting of at least two edible acids selected from the group consisting of phosphoric acid, citric acid and malic acid, and at least one of a polyphosphate, d-limonene and ascorbic acid;
   a flavoring system consisting essentially of one or more flavoring agents selected from the group consisting of flavor extracts and distillates;
   a sweetener; and
   from 0.0 to 3.3 volumes of $CO_2$; wherein the beverage has a pH of from 2.2 to 2.5 and a TA of from 15 to 33.

18. A method of making a microstable soft drink product, comprising the steps of:
   formulating a beverage free of any preservative selected from the group consisting of sorbic acid, benzoic acid, propionic acid and alkali metal salts thereof, said beverage containing water; a flavor system consisting essentially of one or more flavoring agents selected from the group consisting of flavor extracts and distillates; a sweetener; and a microstabilizer consisting essentially of ascorbic acid and an acid combination consisting of at least two edible acids selected from the group consisting of phosphoric acid, citric acid and malic acid; whereby the beverage has a pH of from 2.2 to 2.5 and a TA of from 15 to 33; and
   cold-filling the beverage in a container without any heat treatment or thermal processing.

19. A method of making a microstable soft drink product, comprising the steps of:
   formulating a beverage free of any preservative selected from the group consisting of sorbic acid, benzoic acid, propionic acid and alkali metal salts thereof, said beverage containing water; a flavor system consisting essentially of one or more flavoring agents selected from the group consisting of flavor extracts and distillates; a sweetener; and a microstabilizer consisting essentially of an acid combination consisting of at least two edible acids selected from the group consisting of phosphoric acid, citric acid and malic acid, and at least one of a polyphosphate and d-limonene; whereby the beverage has a pH of from 2.2 to 2.5 and a TA of from 15 to 33; and
   cold-filling the beverage in a container without any heat treatment or thermal processing.

20. A method of making a microstable soft drink product, comprising the steps of:
   formulating a beverage free of any preservative selected from the group consisting of sorbic acid, benzoic acid, propionic acid and alkali metal salts thereof, said beverage containing water; a flavor system consisting essentially of one or more flavoring agents selected from the group consisting of flavor extracts and distillates; a sweetener; one or more nutritional supplements selected from the group consisting of vitamin B2, vitamin B6, vitamin B12, niacin, pantothenic acid, biotin and folic acid; and a microstabilizer consisting essentially of an acid combination consisting of at least two edible acids selected from the group consisting of phosphoric acid, citric acid and malic acid, and a glassy sodium polyphosphate; whereby the beverage has a pH of from 2.2 to 2.5 and a TA of from 15 to 33; and
   cold-filling the beverage in a container without any heat treatment or thermal processing.

* * * * *

UNITED STATES PATENT AND TRADEMARK OFFICE
CERTIFICATE OF CORRECTION

PATENT NO. : 5,417,994
DATED : May 23, 1995
INVENTOR(S) : Chang et al.

It is certified that error appears in the above-indentified patent and that said Letters Patent is hereby corrected as shown below:

Claim 10, col. 9, line 68, change "claim 13" to --claim 9--.

Signed and Sealed this

Eighteenth Day of July, 1995

Attest:

BRUCE LEHMAN

Attesting Officer     Commissioner of Patents and Trademarks